United States Patent [19]

Hirabayashi et al.

[11] Patent Number: 5,327,301
[45] Date of Patent: Jul. 5, 1994

[54] ERASING AND RECOVERING SYSTEM FOR DATA BLOCK ON A MAGNETIC TAPE

[75] Inventors: Naoki Hirabayashi; Toshiya Nakajima; Toshiyuki Kasada; Keiichi Kato; Kinya Saito, all of Kawasaki, Japan

[73] Assignee: Fujitsu Limited, Japan

[21] Appl. No.: 853,491

[22] Filed: Mar. 18, 1992

[30] Foreign Application Priority Data

Mar. 20, 1991 [JP] Japan .................. 3-056940

[51] Int. Cl.⁵ .............................. G11B 5/09
[52] U.S. Cl. ....................... 360/53; 360/66
[58] Field of Search ........... 360/53, 66, 46, 45; 369/53; 371/40.2

[56] References Cited

U.S. PATENT DOCUMENTS 4,664,336  5/1967  Koyama ................... 360/73
4,783,784  11/1988  Ishiguro et al. ............ 371/40.2

FOREIGN PATENT DOCUMENTS 63-76155  4/1988  Japan .
2-148469  6/1990  Japan .

Primary Examiner—Donald Hajec
Assistant Examiner—Jhihan Clark
Attorney, Agent, or Firm—Greer, Burns & Crain, Ltd.

[57] ABSTRACT

In an erasing and recovering system for a data block on a magnetic tape in a magnetic tape recording and reproducing apparatus, the system includes: a detecting unit for detecting data error caused by a damaged portion on the magnetic tape by reading a data block just after the data block is written to the magnetic tape; a calculating unit for calculating the circumference of the magnetic tape including the damaged portion; an erasing unit for erasing half of the circumference including the damaged portion; and a data write unit for re-writing the same data block as the data block including the error into another half of the same circumference as the circumference including the damaged portion.

5 Claims, 10 Drawing Sheets

MAGNETIC TAPE

Fig. 5
PRIOR ART
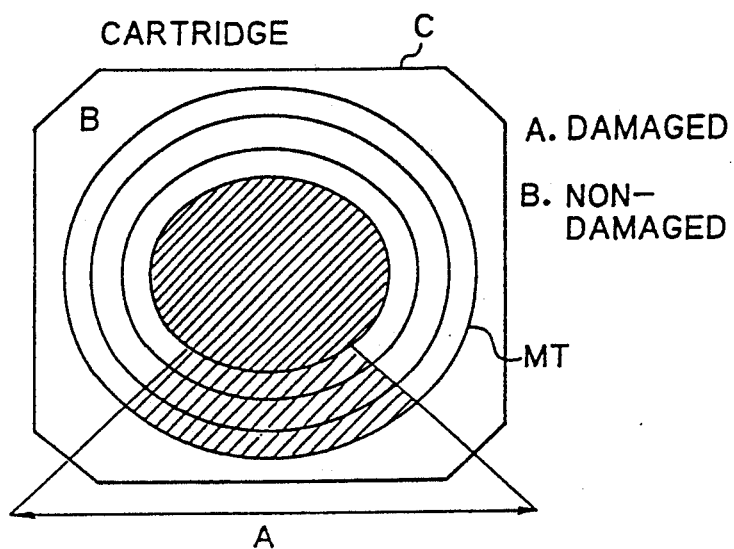
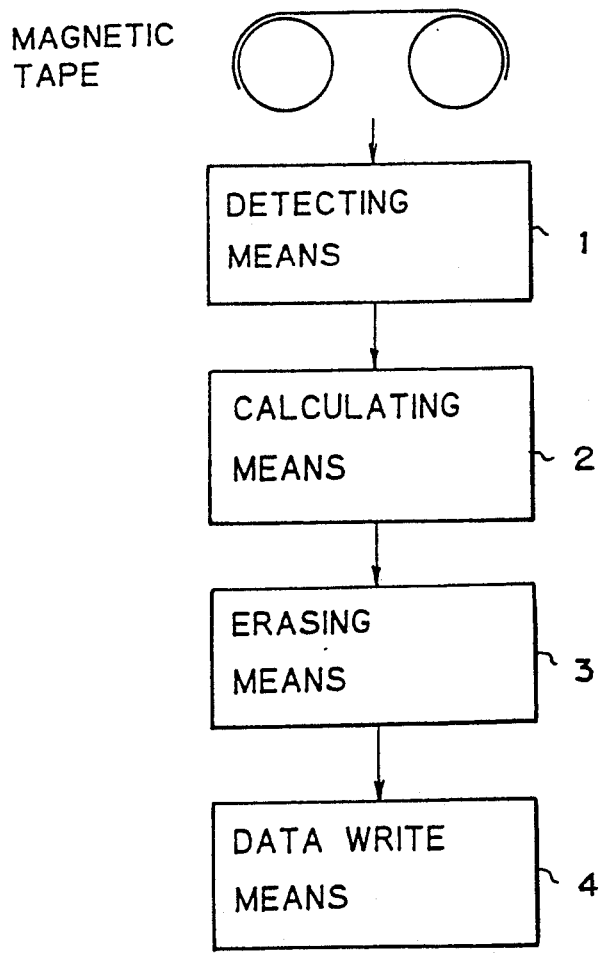
Fig. 6

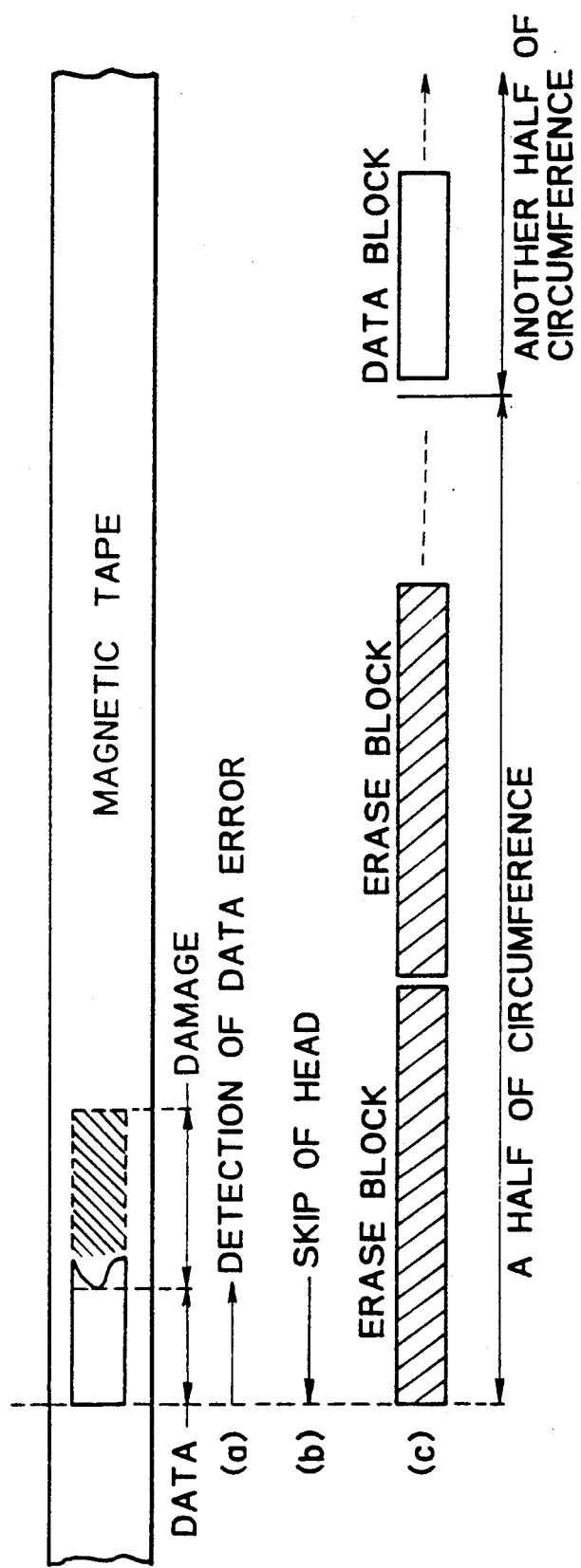

ERASING AND RECOVERING SYSTEM FOR DATA BLOCK ON A MAGNETIC TAPE

BACKGROUND OF THE INVENTION

1. Field of the Invention

The present invention relates to an erasing and recovering system for data block on a magnetic tape in a magnetic tape recording and reproducing apparatus.

2. Description of the Related Art

A magnetic tape recording and reproducing apparatus is widely utilized in various fields, particularly, as an external storage device in a data processing system. In a data processing system handling digital data, the data are recorded in the form of data blocks and reproduced for every data block.

In general, a magnetic tape recording and reproducing apparatus has a magnetic tape control system for controlling various parameters, for example, tape speed, head positions for record and reproduction, sensitivity for record and reproduction, etc. Further, the magnetic tape control system performs a recovery process for data error occurring in a write operation of a data block.

Most data error are caused by damage on the magnetic tape. That is, there are various kinds of damage, for example, pin-hole damages and long damage on the magnetic tape. In general, the former does not have an adverse influence when recording a data block, but the latter had a bad effect in the recording and reproducing process of the data blocks. In general, such damages on the magnetic tape occur in the manufacturing process of the magnetic tape.

In the recovery operation for such data error, a magnetic head is returned to the start position and an erase block is written from the same start position. Further, the same data block is written again from the end of the above erase block.

SUMMARY OF THE INVENTION

The object of the present invention is to provide an erasing and recovering system for a data block on a magnetic tape enabling a reduction of retry time in an erasing and recovering operation.

In accordance with the present invention, there is provided an erasing and recovering system for a data block on a magnetic tape in a magnetic tape recording and reproducing apparatus. The system includes:

a detecting unit for detecting data error caused by a damaged portion on the magnetic tape by reading a data block just after the data block is written on the magnetic tape;

a calculating unit for calculating the circumference of the magnetic tape including the damaged portion;

an erasing unit for erasing a half of the circumference including the damaged portion; and a data write unit for re-writing the same data block as the data block including the error into another half of the same circumference as the circumference including the damaged portion.

In a preferred embodiment, the calculating unit further calculates the number of erase blocks to be included in a half of the circumference of the magnetic tape by dividing a half of the circumference by the unit length of the erase block.

In another embodiment, the calculating unit calculates the circumference based on a physical sector number at the damaged portion.

In still another embodiment, the calculating unit detects the physical sector number based on the following formula, $$1 \leq A < 91 \tag{1}$$

$$A = (62.5(((625 + RI^2 - R^2)^{0.5})/R - 25/RI)) \tag{2}$$

Where, "1" and "91" denote physical sector numbers at most inner and outer circumferences, RI denotes a radius at an initial state (fully wound state) of the magnetic tape, and R denotes a radius at the damaged portion of the magnetic tape.

In still further embodiment, the magnetic tape recording and reproducing apparatus includes a magnetic tape driving unit MTU for driving the magnetic tape MT and a magnetic tape control unit MTC for controlling operation of the magnetic tape driving unit. The magnetic tape control unit has:

a write formatter WFMT for writing data block to the magnetic tape and erasing a half of circumference including a damaged portion of the magnetic tape, and rewriting the same data block as the data block including the damaged portion into another half of the same circumference, the circumference including the damaged portion;

a read formatter RFMT for reading the data block from the magnetic tape, and a formatter FMT for detecting data error caused by the damaged portion on the magnetic tape by reading a data block just after the data block is written to the magnetic tape, calculating the circumference of the magnetic tape including the damaged portion, and sending an erase command to the write formatter to erase a half of the circumference of the magnetic tape including the damaged portion.

BRIEF DESCRIPTION OF THE DRAWINGS

In the drawings:

FIG. 5 is a view explaining damaged area A and nondamaged area B on the wound tape in the cartridge C;

FIG. 6 is a basic block diagram of the present invention;

FIG. 8 is a view explaining an erasing and recovery operation according to the present invention;

DESCRIPTION OF THE PREFERRED EMBODIMENTS

Before describing the preferred embodiments, an explanation will be given of the damage on the magnetic tape and a conventional erasing and recovery method.

Figure 1:
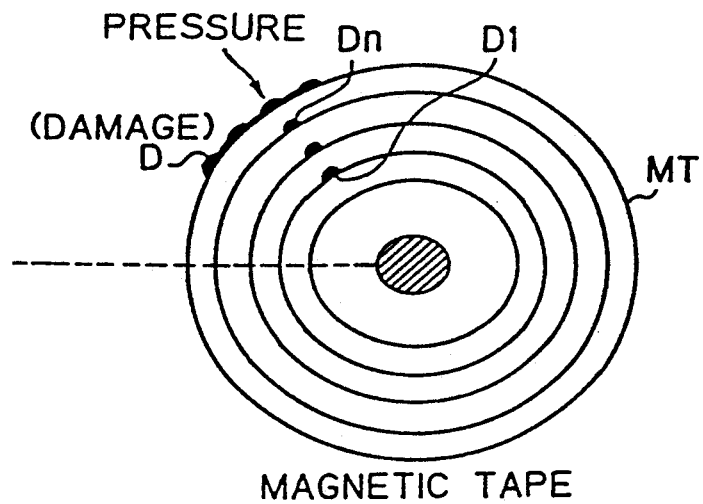
FIG. 1 is a view explaining damaged positions on a magnetic tape.

FIG. 1 is a view explaining damaged positions on a magnetic tape. As shown in the drawing, in general, relatively long damages D and small damages D1 to Dn occur on the magnetic tape. These long and small damages are caused by various factors when manufacturing the magnetic tape, for example, by machines or tools, by material of the magnetic tape, and by a configuration of the winding process of the magnetic tape. These long and small damages on the magnetic tape occur approximately on the same line of the radius as shown in the drawing. This is because the inner damage D1 affects, in sequence, the same position of the adjacent outer tape since the magnetic tape is coaxially and tightly wound in a cartridge.

Figure 2:
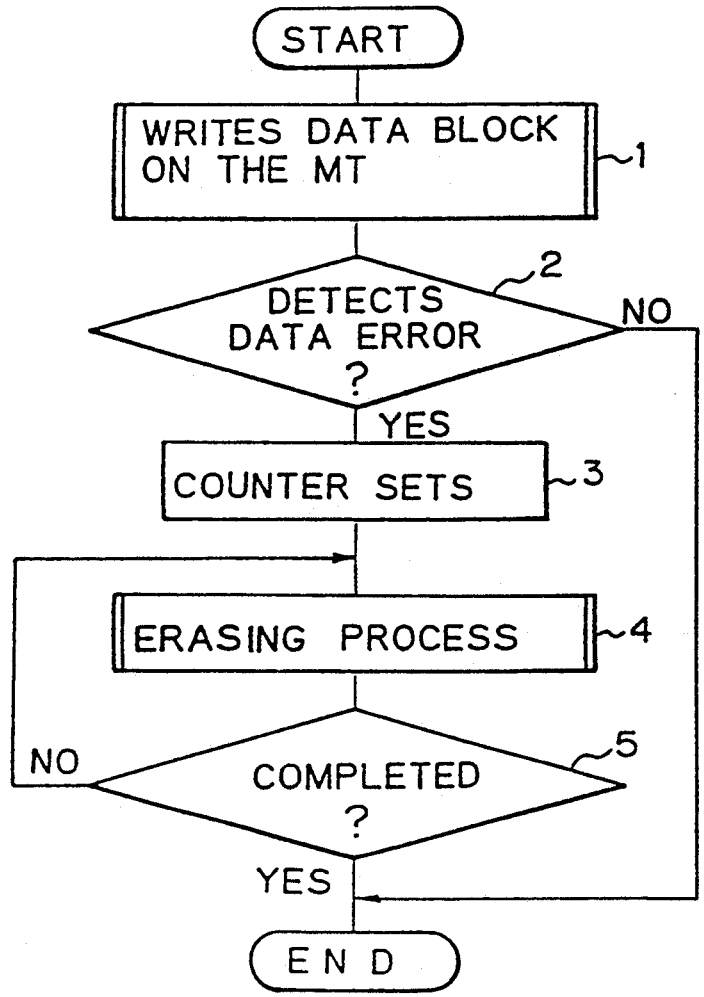
FIG. 2 is a basic flowchart for the conventional recovering process.

FIG. 2 is a basic flowchart for the conventional recovery process. In the recovery process of the conventional method, the magnetic head is returned to the start position of the data block including an error, and an erase block having a predetermined tape length is written from the same start position of the above data block. Further, the same data block is written again from the end of the above erase block, and these steps are repeated. Still further, in the conventional method, the maximum tape length of erase block is previously defined. Accordingly, when the tape length of the damaged portion exceeds the above maximum tape length, the damaged portion is identified in the magnetic tape control system as a "write permanent error".

In FIG. 2, when the data block is written on the magnetic tape under the control of the magnetic tape control system (step 1), this control system detects whether or not the error occurs in the data block (step 2). When the data error occurs in the data block (YES), an erasing process for the damaged portion is performed based on values counted by a counter in the control system (step 3 and 4), and the control system detects whether or not the erasing process is completed (step 5).

Figure 3:
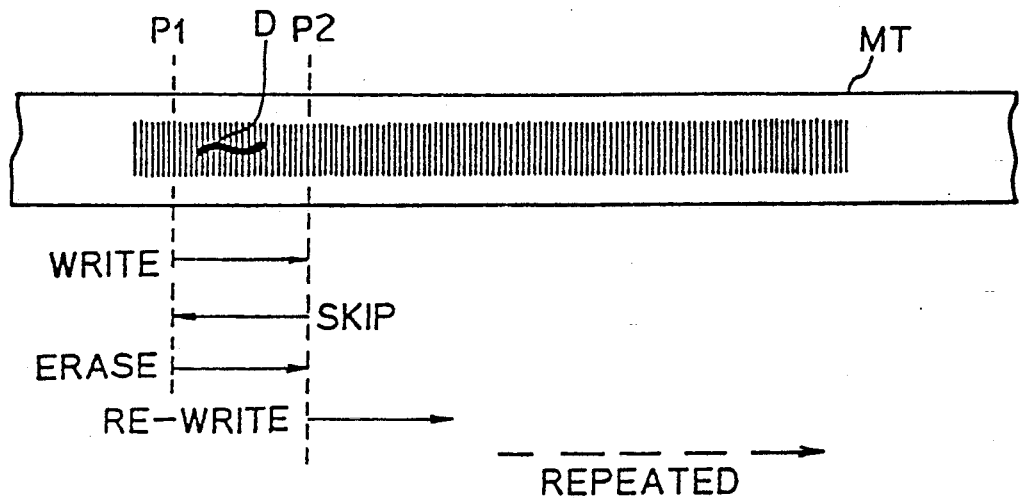
FIG. 3 is a view explaining a conventional method of a retry process.

FIG. 3 is a view explaining a conventional method of a retry process, i.e., erasing and recovery operation. As shown in the drawing, assuming that the damage D exists between positions p1 and p2 on the magnetic tape. When the data block is written from the position p1 of the magnetic tape, the magnetic tape control system detects the data error at the position p2 so that the magnetic tape is returned to the start position p1 (so-called, skipping operation). Then, the control system performs an erasing process to write the erase block from the position p1 to the position p2. Further, the same data block as above is re-written from the position p2. These steps are repeated for the next damage on the magnetic tape MT.

In this case, the tape length of the erase block is defined as "7.8 mm" of unit length on the magnetic tape as the Standard. Accordingly, if the damaged portion is very long or repeatedly occurs on the magnetic tape, and the above erasing and recovering process must be repeated for every defined unit length of 7.8 mm, a long time is needed for this erasing and recovering process in the conventional method. Further, when one damaged length is longer than the defined unit length of 7.8 mm, this large damage results in a permanent write error.

Figure 4:
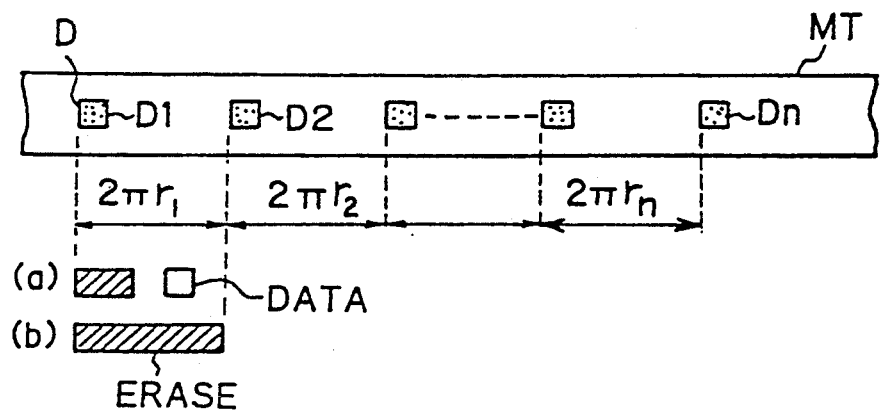
FIG. 4 is a view explaining an erase block on the magnetic tape.

FIG. 4 is a view explaining an erase block on the magnetic tape. In the drawing, $2\pi r_1$, $2\pi r_2$, ..., $2\pi r_n$ denote circumferences of the magnetic tape. The damaged portion (D1 to Dn) occurs for every one circumference as explained in FIG. 1. In the case of (a), if it is possible to shorten the erase block (slant portion) to cover only the damaged portion D1, it may be possible to write a data block within one circumference of $2\pi r_1$, and there is no problem in this case. However, in the case of (b), if the erase block is very long, the next damage portion appears in the next data block so that it is necessary to provide a next erase block to erase the next damage.

FIG. 5 is a view explaining damaged area A and non-damaged area B on the wound tape in the cartridge C. In the conventional method, the unit length of the erase block is previously defined. Accordingly, if the damaged portion is longer than the defined unit length of the erase block, this portion is processed as a "write permanent error". Accordingly, if each damage on the damaged area A is longer than the defined unit length of the erase block, it is impossible to use the non-damaged area B to write the data since this area is processed as a "write permanent error". Accordingly, it is necessary to avoid a "write permanent error" to efficiently use the magnetic tape and reduce the retry time.

FIG. 6 is a basic block diagram of the present invention. The aspect of the present invention is based on the following view points. That is, first, the damages occur in the same radius direction for every circumference (see FIG. 1), and, second, almost all damages may be shorter than a half of the circumference of the magnetic tape. Accordingly, in the present invention, the length of the erase block is defined to be half of the circumference of the magnetic tape at the damaged portion.

Based on the above aspect of the present invention, an erasing and recovering system according to the present invention is formed by a detecting means 1 for detecting data error caused by a damaged portion on the magnetic tape by reading a data block just after the data block is written to the magnetic tape; a calculating means 2 for calculating the circumference of the magnetic tape including the damaged portion; erasing means 3 for erasing half of the circumference including the damaged portion; and a data write means 4 for re-writing the same data including the data error into another half of the circumference of the magnetic tape. According to the present invention, it is possible to considerably reduce the retry time in the erasing and recovery process.

Figure 7:
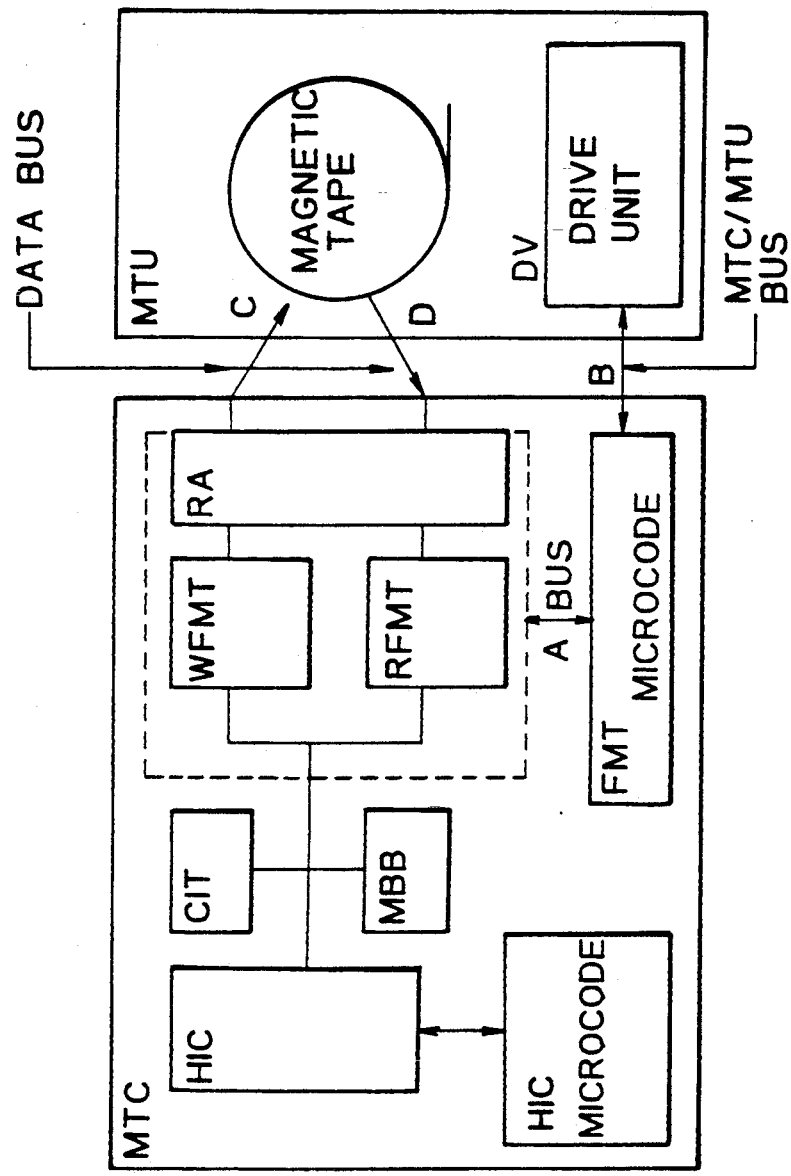
FIG. 7 is a schematic block diagram of a magnetic tape recording and reproducing apparatus having a magnetic tape recording and reproducing unit MTU and a magnetic tape control unit MTC applying the present invention.

FIG. 7 is a schematic block diagram a magnetic tape recording and reproducing apparatus having a magnetic tape driving unit MTU and a magnetic tape control unit MTC applying the present invention. In the driving unit MTU, MT denotes the magnetic tape, and DV denotes a drive unit for driving the magnetic tape. In the control unit MTC, HIC denotes a host interface controller formed by software and hardware to control the host interface, and CIT denotes a table to register the control data of a job to be used by the MTC and to store the record of the error on the magnetic tape. MBB denotes a multi-block buffer used to store data for every data block when writing them.

WFMT denotes a write formatter for forming a write data block and erase block and controlling the transfer sequence of a write data block and the erase block in the write operation. RFMT denotes a read formatter for controlling a transfer of the data block to the MBB in the read operation. RA denotes a decoder for analog data read from the magnetic tape. Further, FMT denotes a formatter formed by a software for detecting data error from the read data.

The write data is checked by a "read-back check" operation during a write operation, and an error of the write data is found from an abnormal state of a read data sequence in the read-back check operation. In this case, the "read-back check" means that the magnetic head reads the data just before written by the write head, and determines whether or not the read data is correct.

The data to be written is read from the buffer MBB and written to the magnetic tape through the write formatter WFMT. The write data is read through the magnetic head and transferred to the read formatter RFMT. Further, the above write and read sequence is imparted to the formatter FMT through the control bus A. The write and read sequence includes a start and end of data block and data error. Accordingly, when the formatter FMT detects data error, the formatter FMT generates a command to the drive unit DV through the control bus B to return the magnetic tape to the start position of the data block. Further, the formatter FMT generates a command to the write formatter WFMT therefor the control bus A to write the erase block from the start position of the data block including an error. The write data is written from the decoder RA to the magnetic tape MT through the bus C, and the read data is read from the magnetic tape MT to the decoder RA through the bus D. These process is called a "retry" operation as mentioned above.

Briefly, the magnetic tape recording and reproducing apparatus includes the magnetic tape driving unit MTU for driving the magnetic tape MT and the magnetic tape control unit MTC for controlling operation of the magnetic tape driving unit, and the magnetic tape control unit has: a write formatter WFMT for writing data block to the magnetic tape and erasing a half of circumference including damaged portion of the magnetic tape, and rewriting the same data block as the data block including the damaged portion into another half of the same circumference as the circumference including the damaged portion; a read formatter RFMT for reading the data block from the magnetic tape; and a formatter FMT for detecting data error caused by damaged portion on the magnetic tape by reading data block just after the data block is written to the magnetic tape, calculating circumference of the magnetic tape including the damaged portion, and sending erase command to the write formatter to erase a half of the circumference of the magnetic tape including the damaged portion.

FIG. 8 is a view explaining the erasing and recovering operation according to the present invention. As shown in the drawing, there are data and damaged portions (slanted line) on the magnetic tape.

In step (a), the formatter FMT detects an abnormal state of a write sequence at the position "X" through the read format RFMT and the control bus A in FIG. 7.

In step (b), the formatter FMT generates a command to the driver DV to return the magnetic head (write head) to the position P1 through the bus B.

In step (c), the write formatter WFMT writes a long erase block having half of a circumference of the magnetic tape from the position P1, and data block is written after this erase block, i.e., a half of the circumference of the opposite side.

In this case, the circumference of the magnetic tape is calculated based on a physical sector obtained from the ratio between the radius of a fully wound tape and a radius of a damaged portion as explained below. The length of the erase portion calculated from the ratio of radius is stored in the table. As mentioned above, the length of one data block is already defined as 7.8 mm, and length of a non-recording area (gap) is already defined as approximately 2 mm so that the unit length of an erase block is given by about 9.8 (7.8+2) mm. Accordingly, half of the circumference is divided by the above unit length of 9.8 mm to determine the number of the erase block. The data for this calculation are stored in the table.

Figure 9A:
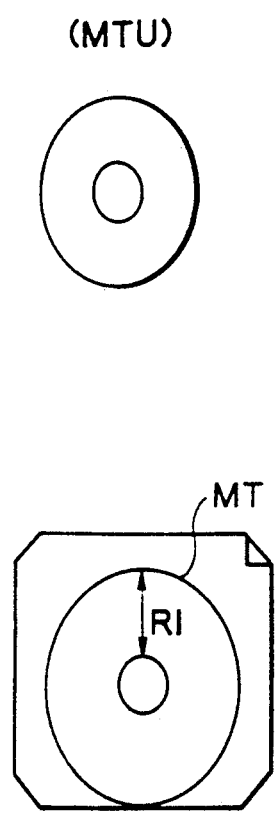
FIG. 9A and 9B are views explaining a physical sector.
Figure 9B:
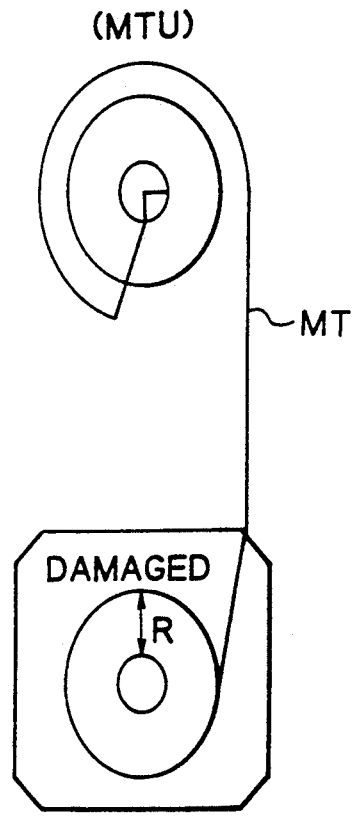

FIGS. 9A and 9B are views explaining the physical sector. The calculation of the physical sector is given by the following formula. In the drawings, RI denotes a radius at an initial state (fully wound state) of the magnetic tape, and R denotes a radius at a damage portion of the magnetic tape.

$$1 \leq A < 91 \tag{1}$$

$$A = (62.5(((625 + RI^2 - R^2)^{0.5})/R - 25/RI)) \tag{2}$$

Where, "1" and "91" denote sector numbers.

As is obvious from the formula (2), the physical sector can be obtained from the ratio between the radius R and RI.

Figure 10:
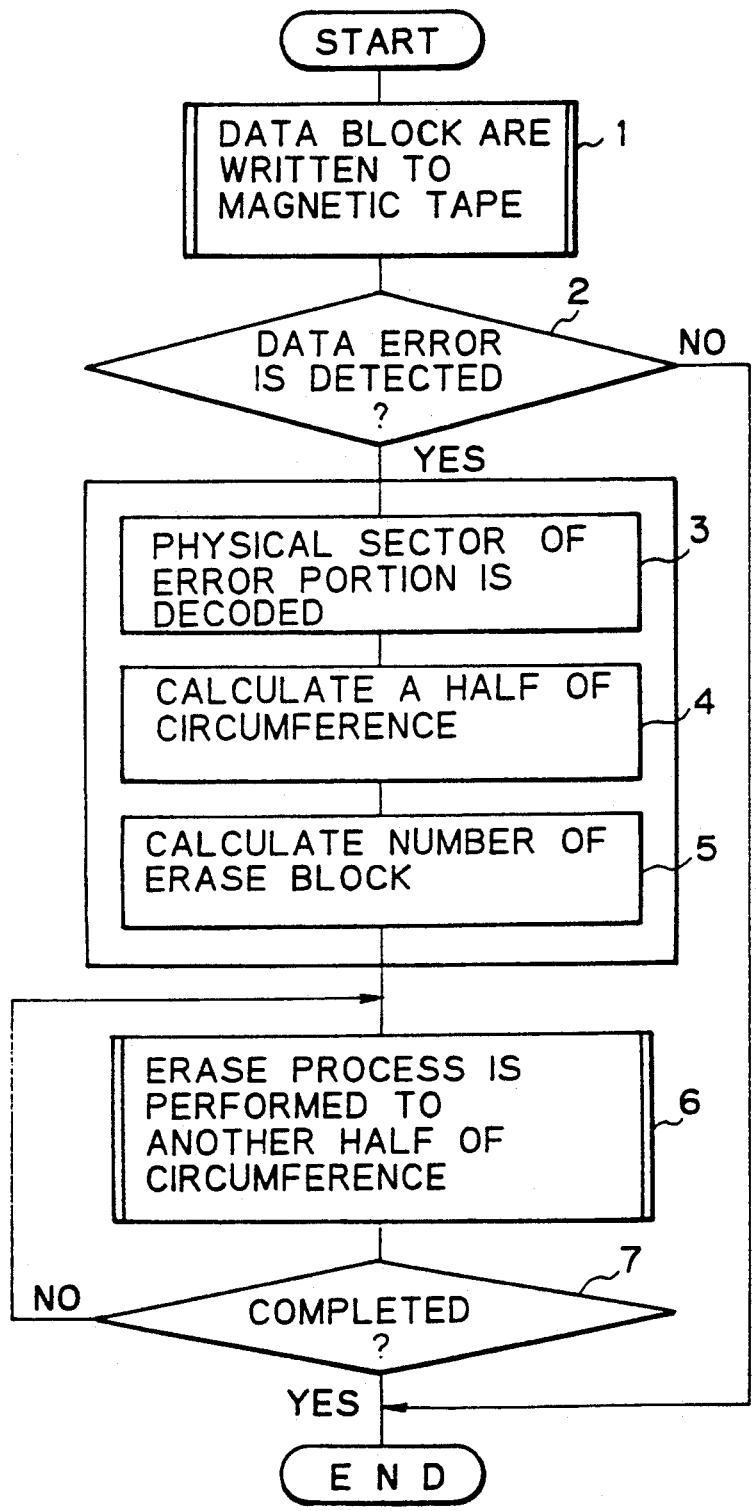
FIG. 10 is a basic flowchart for a recovery process according to the present invention.

FIG. 10 is a basic flowchart for a recovery process according to the present invention. The data block is written to the magnetic tape MT through the write formatter WFMT, the decoder RA and the bus C (step 1). The read formatter RFMT reads the data block from the magnetic tape MT through the bus B and the decoder RA, and detects data error (step 2). When data error is found (YES) in the read formatter RFMT, the physical sector of the error portion is decoded (step 3), and a half of the circumference including an error portion is calculated by the MTC based on the above formula (1) and (2). Further, the number of the erase block is also calculated by dividing a half of the circumference into one unit length of defined erase block (step 4 and 5) as explained above. Then, the erasing process is performed on half of the circumference of the magnetic tape based on the number of the erase block, and the data is rewritten to another half of the circumference of the same magnetic tape. As a result, the erasing and recovery process is completed (steps 6 and 7).

In the present invention, since an erase process is performed on half of the circumference of the magnetic tape and the recovery process is performed on the other half of the circumference, it is possible to reduce the retry time and avoid the write permanent error for large damages.

Figure 11:
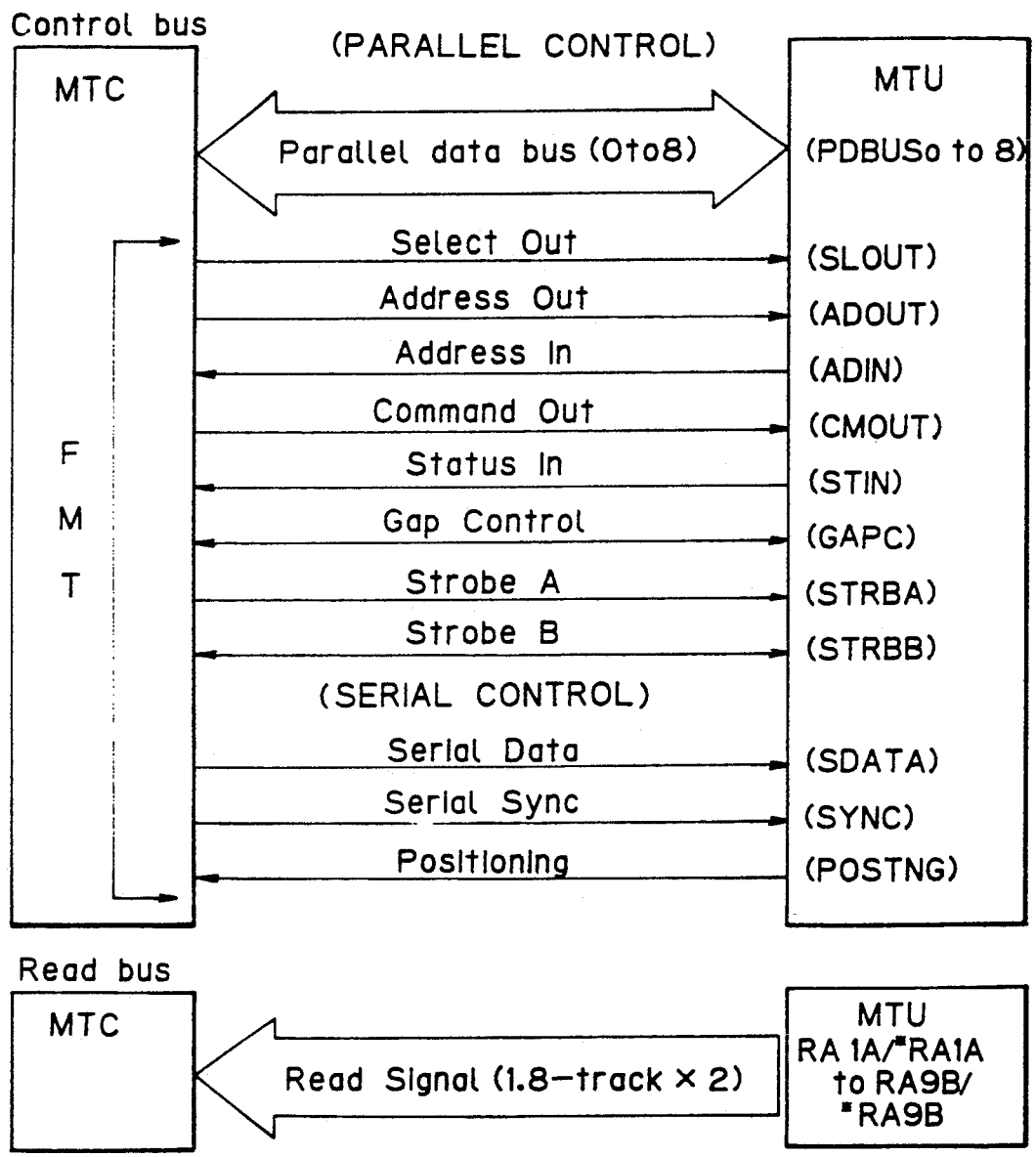
FIG. 11 is a view explaining signals between the magnetic tape control unit MTC and the magnetic tape drive unit MTU.

FIG. 11 is a view explaining signals between the magnetic tape control unit MTC and the magnetic tape drive unit MTU. As shown in the drawing, the control bus is formed by parallel and serial control lines, and these lines are provided between the MTC and the MTU. Further, the read bus is provided between the MTC and the MTU.

The parallel data buses PDBUS-0 to PDBUS-8 are two-way, and used to send selected addresses, command codes, transfer data, and write data from the MTC to the MTU. Further, these buses are used to send transfer data and interruption information such as complement addresses, status bytes, and sense bytes from the MTU. When sending write data, all lines are used for data, and when sending the interruption information, signal lines 0 to 7 are used to indicate whether each MTU is interrupted, and bit 8 has no meaning. In another case, 0 to 7 are data, and bit 8 is the parity bit.

The following signals are transferred between the formatter FMT of the MTC and the MTU. That is, a select-out signal SLOUT, an address-out signal ADOUT, an address-in signal ADIN, a command-out signal CMOUT, a status-in signal STIN, a gap control signal GAPC, a strobe A signal STRBA, a strobe B signal STRBB, a serial data SDATA, a serial sync SYNC, and a positioning signal POSTNG.

The select-out signal SLOUT is sent from the MTC to the MTU. When this signal is "1", the MTC performs a parallel control of the selected MTU. When this signal is "0", the MTU can place an interruption signal on the parallel data bus.

The address-out signal ADOUT is sent from the MTC to the MTU. This signal is used to select a unit from the MTU that is connected to the MTC. The MTC places the address of the MTU to be selected on the parallel data bus and sets this signal to "1".

The address-in signal ADIN is sent from the MTU to the MTC. This signal is used for two things, i.e., response of the address-out signal ADOUT in the selected sequence, and interruption signals during the data transfer.

The command-out signal CMOUT is sent from the MTC to the MTU. In the start sequence of a parallel command, the MTC places the command code on the data bus, and sets this signal as "1". After reading the status byte, the MTC resets this signal to "0", and completes the start sequence.

The status-in signal STIN is sent from the MTU to the MTC. This signal is set by the MTU to "1" as a response signal to the command-out signal and the gap-out signal. When this signal is set to "1" as a response to the command-out signal, it indicates that the status byte "1" is placed on the data bus. When all respond signals become "0", then this signal also becomes "0".

The gap-control signal GAPC has a two-way between the MTC and the MTU, and is used for displaying the data block position during execution of a read and write command.

The strobe A signal STA is a one-way signal and is sent from the MTC to the MTU. This signal has three sequences, i.e., the start and end sequence of a parallel command, the data transfer sequence, and the transfer of the write data.

The strobe B signal STB is a two-way signal between the MTC and the MTU. This signal has three sequences, i.e., the parallel command start and end sequence, the data transfer sequence, and the write data transfer sequence.

The serial data SD is a data line for a serial command that is sent from the MTC to the MTU. The serial command consists of 18-bit serial data.

The serial synchronous signal SYNC is a synchronizing signal. This signal is used to send a serial command with serial data.

The positioning signal POS is a pulse sent to the MTC when the MTU needs re-positioning on receiving a serial read and write command. When this pulse signal is sent, the MTU interrupts the MTC.

Further, in the read bus, the read signals are formed by 18-tracks×2 and sent from MTU to the MTC.

Figure 12:
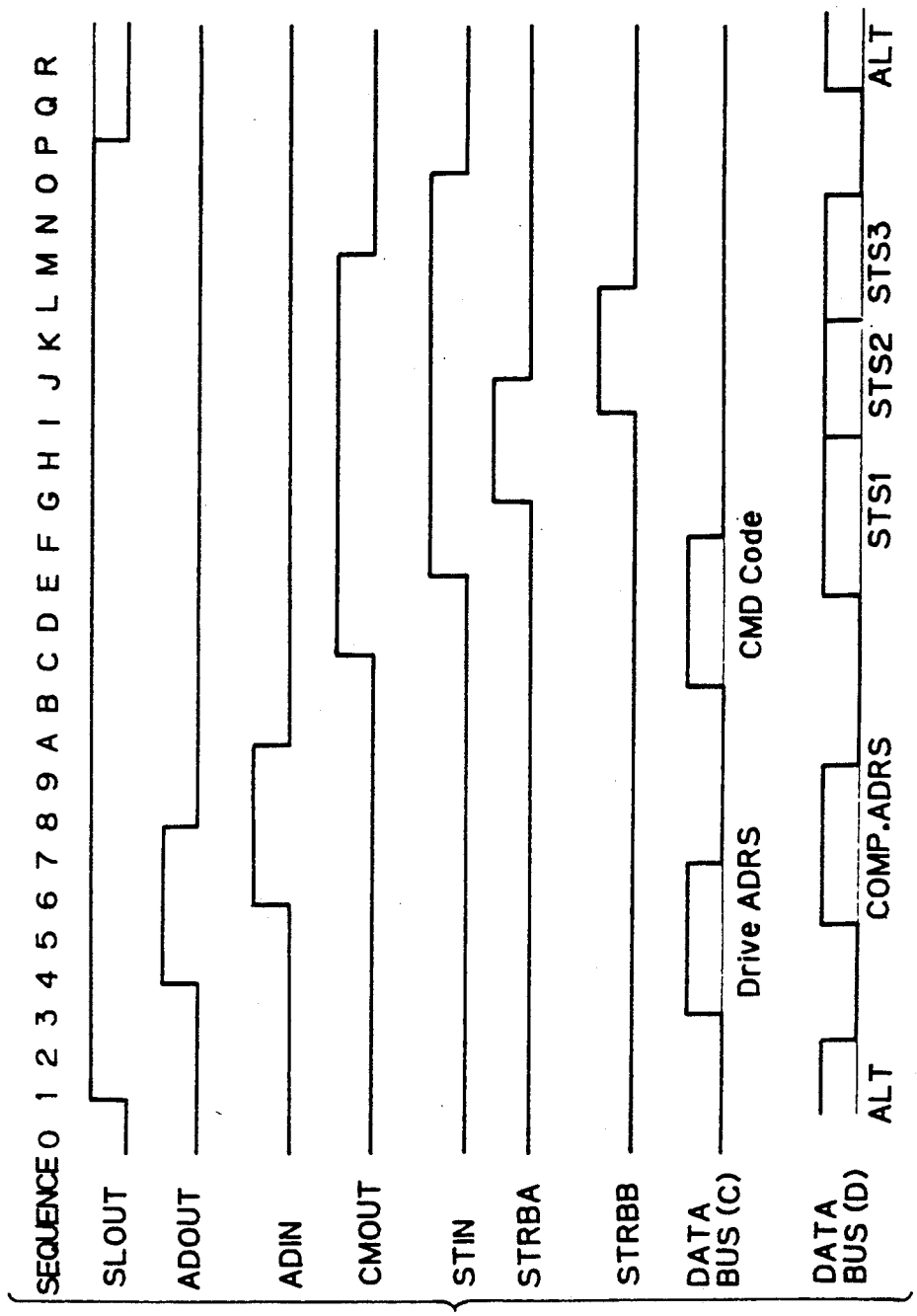
FIG. 12 is a signal timing chart explaining a start sequence.
Figure 13:
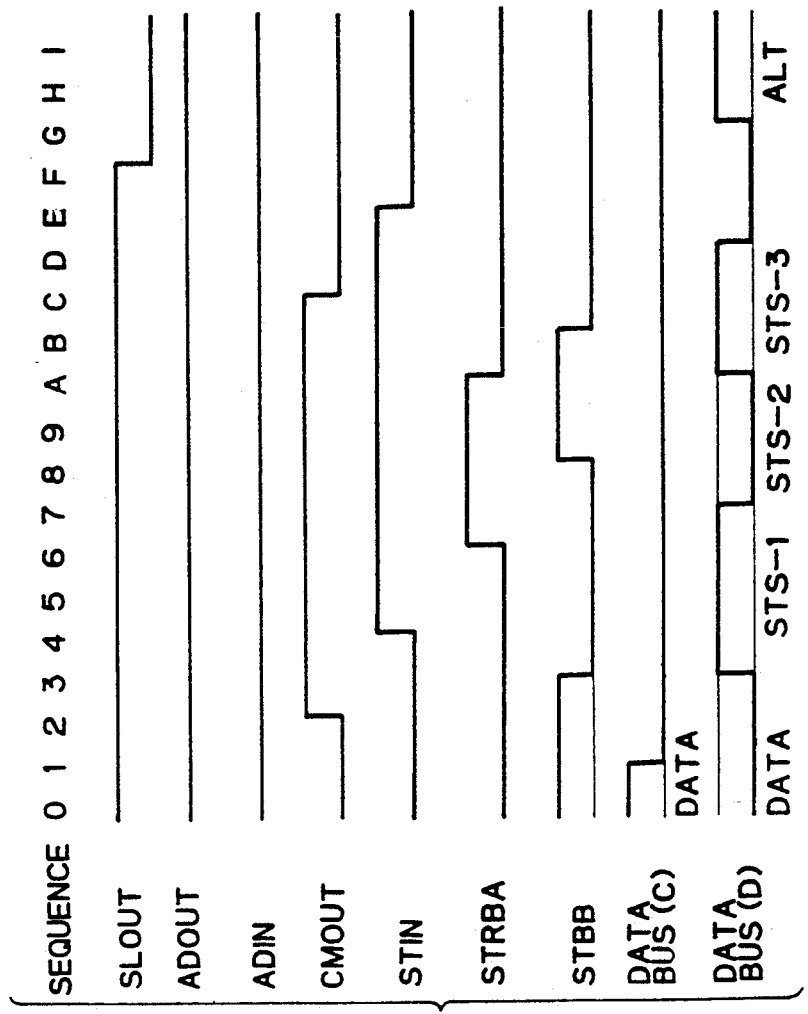
FIG. 13 is a signal timing chart explaining an end sequence shown in FIG. 11.

FIG. 12 is a signal timing chart explaining a start sequence, and FIG. 13 is a signal timing chart explaining an end sequence shown in FIG. 11. In the drawing, ALT denotes an interruption information, and STS denotes a count of the physical sector.

In FIG. 12, the MTU sends the interruption information ALT to the data bus. The MTC sends the address of the MTU to be selected to the data bus (sequence 3), and sets the address-out ADOUT to "1" (sequence 4). At this point, the MTU with its logical address matched with the address on the data bus sends the complement address to the data bus (sequence 5), and replies by setting the address-in signal ADIN to "1" (sequence 6). When checking if the address-in signal ADIN is set to "1", the MTC releases the data bus (sequence 7), and confirms the complement address. Then, the MTC resets the address-out signal ADOUT to "0" (sequence 8), and the MTU resets the address-in signal ADIN to "0", releasing the data bus (sequence A). Selection has been completed and one MTU has been selected.

Then, the MTC sends a command to the MTU. The MTC sends a command to the data bus (sequence B), and sets the command-out signal CMOUT to "1" (sequence C). After receiving and decoding the command code, the MTU sends status byte "1" to the data bus (sequence D), and replies by setting the status-in signal STIN to "1" (sequence E). The MTC releases the data bus (sequence F), and on receipt of status byte "1", sets the strobe A signal, which requests the next status byte to "1" (sequence G). The MTU switches the data bus to the next status bus (sequence H), and replies (sequence I) by setting the strobe B signal to "1". The MTC reads the status byte, and resets the strobe A signal to "0" (sequence J). The MTU prepares the next status byte (sequence K), and resets the strobe B signal to "0" (sequence L). After receiving the status byte, the MTC resets the command-out signal CMOUT to "0" (sequence M). The MTU releases the data bus (sequence N), resets the status-in signal STIN to "0", and terminates the start sequence. When terminating the command with the start sequence only, the MYC resets the select-out signal SLOUT to "0" (sequence P). Then, the MTU begins sending interruption information ALT on the data bus (sequence Q).

FIG. 13 is the end sequence when the drive of the magnetic tape is stopped. The detailed explanations are omitted because it is easy to understand this timing chart based on the timing chart shown in FIG. 11. In this case, the physical sectors STS1 to STS3 are counted for the calculation of the radius based on the formula (1) and (2).

We claim:

1. An erasing and recovering system for a data block on a magnetic tape in a magnetic tape recording and reproducing apparatus, the system comprising:
   detecting means for detecting data error caused by a damaged portion on the magnetic tape by reading a data block just after the data block is written to the magnetic tape;

calculating means for calculating the circumference of the magnetic tape including the damaged portion;

erasing means for erasing a half of the circumference including the damaged portion; and data write means for re-writing the same data block as the data block including the error into another half of the same circumference as the circumference including the damaged portion.

2. An erasing and recovering system as claimed in claim 1, wherein said calculating means further calculates the number of erase blocks to be included in half of the circumference of the magnetic tape by dividing a half of the circumference by the unit length of the erase block.

3. An erasing and recovering system as claimed in claim 1 wherein said calculating means calculates the circumference based on a physical sector number at the damaged portion.

4. An erasing and recovering system as claimed in claim 3, wherein said calculating means detects the physical sector number based on the following formula, $$1 \leq a < 91 \qquad (1)$$

$$A = (62.5(((625 + RI^2 - R^2)^{0.5})/R - 25/RI)) \qquad (2)$$

Where, "1" and "91" denote physical sector numbers at most inner and outer circumferences, RI denotes a radius at initial state (fully wound state) of the magnetic tape, and R denotes a radius at the damaged portion of the magnetic tape.

5. A magnetic tape recording and reproducing apparatus including a magnetic tape driving unit (MTU) for driving the magnetic tape (MT) and a magnetic tape control unit (MTC) for controlling operation of the magnetic tape driving unit, said magnetic tape control unit comprising:

a write formatter (WFMT) for writing data block to the magnetic tape and erasing a half of circumference including damaged portion of the magnetic tape, and rewriting the same data block as the data block including the damaged portion into another half of the same circumference as the circumference including the damaged portion;

a read formatter (RFMT) for reading the data block from the magnetic tape, and a formatter (FMT) for detecting data error caused by damaged portion on the magnetic tape by reading data block just after the data block is written to the magnetic tape, calculating circumference of the magnetic tape including the damaged portion, and sending erase command to the write formatter to erase a half of the circumference of the magnetic tape including the damaged portion.

* * * * *